US012342146B2

(12) United States Patent
Wang et al.

(10) Patent No.: US 12,342,146 B2
(45) Date of Patent: Jun. 24, 2025

(54) SOUND GENERATING DEVICE MODULE

(71) Applicant: GOERTEK INC., Shandong (CN)

(72) Inventors: Qizhong Wang, Shandong (CN); Zongjun Mou, Shandong (CN)

(73) Assignee: GOERTEK INC., Weifang (CN)

( * ) Notice: Subject to any disclaimer, the term of this patent is extended or adjusted under 35 U.S.C. 154(b) by 226 days.

(21) Appl. No.: 18/042,045

(22) PCT Filed: Nov. 7, 2020

(86) PCT No.: PCT/CN2020/127368

§ 371 (c)(1),
(2) Date: Feb. 17, 2023

(87) PCT Pub. No.: WO2022/036876

PCT Pub. Date: Feb. 24, 2022

(65) Prior Publication Data

US 2023/0319481 A1 Oct. 5, 2023

(30) Foreign Application Priority Data

Aug. 20, 2020 (CN) ......................... 202010840152.8

(51) Int. Cl.
*H04R 9/06* (2006.01)

(52) U.S. Cl.
CPC ..................................... *H04R 9/06* (2013.01)

(58) Field of Classification Search
CPC . H04R 9/02; H04R 9/06; H04R 9/025; H04R 7/02; H04R 1/2846; H04R 9/063;
(Continued)

(56) References Cited

U.S. PATENT DOCUMENTS 7,142,686 B2 * 11/2006 Furuya .................. H04R 9/063 381/396
2004/0071303 A1 * 4/2004 Furuya .................. H04M 1/035 379/433.02

(Continued)

FOREIGN PATENT DOCUMENTS

CN 109168115 A 1/2019
CN 208675521 U 3/2019

(Continued)

OTHER PUBLICATIONS

International Search Report from International Application No. PCT/CN2020/127368 mailed May 19, 2021.

*Primary Examiner* — Carolyn R Edwards
*Assistant Examiner* — Julie X Dang
(74) *Attorney, Agent, or Firm* — Shih IP Law Group, PLLC

(57) ABSTRACT

Disclosed in the present application is a sound generating device module, comprising: a housing having a cavity therein; a frame fixedly provided in the cavity, a high-pitch sound generating unit and a low-pitch sound generating unit are respectively provided on two opposite sides of the frame; a baffle plate is provided on a side of the housing corresponding to the high-pitch sound generating unit, and the baffle plate and the housing together form a side sound output port corresponding to the high-pitch sound generating unit; the frame and the housing form a first rear sound cavity and a second rear sound cavity isolated from each other in the cavity, the first rear sound cavity is communicated with the low-pitch sound generating unit, and the second rear sound cavity is communicated with the high-pitch sound generating unit.

8 Claims, 1 Drawing Sheet

(58) Field of Classification Search
CPC . H04R 1/26; H04R 1/04; H04R 1/345; H04R 1/025; H04R 2400/11; H04R 1/2819; H04R 9/045; H04R 1/24; H04R 7/10
See application file for complete search history.

(56) References Cited

U.S. PATENT DOCUMENTS

| | | | | |
|---|---|---|---|---|
| 2006/0120051 | A1* | 6/2006 | Macris | H01L 24/32 257/E23.137 |
| 2006/0120551 | A1* | 6/2006 | Enomoto | H04R 9/025 381/396 |
| 2009/0136065 | A1* | 5/2009 | Yano | H04R 9/10 381/186 |
| 2017/0013336 | A1 | 1/2017 | Stys et al. | |
| 2018/0270578 | A1 | 9/2018 | Chang et al. | |

FOREIGN PATENT DOCUMENTS

| | | | |
|---|---|---|---|
| CN | 209419834 | U | 9/2019 |
| CN | 211019215 | U | 7/2020 |
| CN | 111711896 | A | 9/2020 |

* cited by examiner

SOUND GENERATING DEVICE MODULE

TECHNICAL PROBLEM

The present disclosure relates to the technical field of acoustic-electric conversion, and in particular, to a sound generating device module.

BACKGROUND ART

A sound generating device, as a device for people's entertainment at ordinary times, has been put forward higher and higher requirements as people have higher and higher requirements for the quality of life.

As a core component of sound generating devices such as home audio, car audio and electronic device, the sound generating device is widely used in electronic products. The product quality of the sound generating device module itself directly affects the sound generating quality. In recent years, the development trend of electronic products tends to be thinner and smaller. For example, most mobile phone manufacturers may manufacture the mobile phone thinner and thinner, thus the volume of each electronic component in the corresponding mobile phone may be correspondingly compressed. However, such a requirement for structural design will seriously affect the acoustic performance of the sound generating device module, resulting in a defect that the acoustic performance cannot meet the requirements for sound quality.

Therefore, it is necessary to improve the structure of the sound generating device module and optimize the structure in a limited space so as to optimize the acoustic performance.

SUMMARY

An object of the present application is to provide an improved sound generating device module.

According to an aspect, the present application provides a sound generating device module, including:

a housing having a cavity therein;

a frame fixedly provided in the cavity, a high-pitch sound generating unit and a low-pitch sound generating unit are respectively provided on two opposed sides of the frame;

a baffle plate is provided on a side of the housing corresponding to the high-pitch sound generating unit, and the baffle plate cooperates with the housing to form a side sound output port corresponding to the high-pitch sound generating unit;

the sound generating device module is configured to form a front sound output structure for the low-pitch sound generating unit;

the frame and the housing form a first rear sound cavity and a second rear sound cavity isolated from each other in the cavity, the first rear sound cavity is communicated with the low-pitch sound generating unit, and the second rear sound cavity is communicated with the high-pitch sound generating unit.

Optionally, an edge of the frame bends and extends towards a direction opposite to the baffle plate to form a first accommodation groove, and at least a part of a structure of the low-pitch sound generating unit is disposed in the first accommodation groove;

a through hole is provided at a middle of the frame, a side wall of the through hole bends and extends towards a direction of the baffle plate to form a second accommodation groove, and at least a part of a structure of the high-pitch sound generating unit is disposed in the second accommodation groove;

a partition plate is provided surrounding the high-pitch sound generating unit on a side of the frame facing the baffle plate, and the partition plate separates the cavity to form the first rear sound cavity and the second rear sound cavity.

Optionally, the low-pitch sound generating unit includes a first magnet, a first coil and a first diaphragm, the first magnet is disposed in the first accommodation groove and is fixed on a bottom of the first accommodation groove, the first diaphragm is disposed on the housing on an opposite side of an opening of the first accommodation groove, a first magnetic gap is provided between the first magnet and a wall of the first accommodation groove, the first coil is connected with the first diaphragm, and the first coil is located in the first magnetic gap;

the high-pitch sound generating unit includes a second magnet, a second coil and a second diaphragm, the second magnet is disposed in the second accommodation groove and is fixed on the first magnet, the second diaphragm is disposed on the housing at an opposite side of an opening of the second accommodation groove, a second magnetic gap is provided between the second magnet and a wall of the second accommodation groove, the second coil is connected with the second diaphragm, and the second coil is located in the second magnetic gap.

Optionally, a first sound output hole is provided at a position of the housing corresponding to an opening of the first accommodation groove, and the first diaphragm covers on the first sound output hole;

a second sound output hole is provided at a position of the housing corresponding to an opening of the second accommodation groove, and the second diaphragm covers on the second sound output hole;

an area of the first sound output hole is larger than an area of the second sound output hole.

Optionally, edges of the first diaphragm and edges of the second diaphragm are fixed on the housing;

a portion of the first diaphragm close to an edge of the first sound output hole is recessed towards inside of the cavity to form a first rim;

a portion of the second diaphragm close to an edge of the second sound output hole is recessed towards inside of the cavity to form a second rim;

a first stiffening plate and a second stiffening plate are respectively fixed on the first diaphragm and the second diaphragm.

Optionally, a first washer is disposed on a side of the first magnet facing the first diaphragm; and a second washer is disposed on a side of the second magnet facing the second diaphragm.

Optionally, an edge of the frame bends and extends towards a direction opposite to the baffle plate to form a third accommodation groove, and at least a part of a structure of the low-pitch sound generating unit is disposed in the third accommodation groove;

a mounting hole is provided at a middle of the frame, and at least a part of a structure of the high-pitch sound generating unit is disposed in the third accommodation groove by penetrating the mounting hole;

a partition plate is provided surrounding the high-pitch sound generating unit on a side of the frame facing the baffle plate, and the partition plate separates the cavity to form the first rear sound cavity and the second rear sound cavity.

Optionally, the low-pitch sound generating unit includes a third magnet, a third coil and a third diaphragm, the third magnet has an annular shape and is fixed on a bottom of the third accommodation groove, a third magnetic gap is provided between the third magnet and a wall of the third accommodation groove, the third coil is connected with the third diaphragm, and the third coil is located in the third magnetic gap;

the high-pitch sound generating unit includes a fourth magnet, a fourth coil and a fourth diaphragm, the fourth magnet has a columnar shape and is positioned in a center of the third magnet by penetrating the mounting hole, a fourth magnetic gap is provided between the fourth magnet and the third magnet, the fourth diaphragm is disposed on a side of the housing corresponding to the baffle plate, the fourth coil is connected with the fourth diaphragm, and the fourth coil is located in the fourth magnetic gap.

Optionally, a third washer is disposed on a side of the third magnet facing an opening of the third accommodation groove, and the fourth magnet is fixed on the third washer.

Optionally, a third sound output hole is provided at a position of the housing corresponding to an opening of the third accommodation groove, and the third diaphragm covers on the third sound output hole;

a fourth sound output hole is provided at a side of the housing opposite to the third sound output hole, and the fourth diaphragm covers on the fourth sound output hole;

an area of the third sound output hole is larger than an area of the fourth sound output hole.

The sound generating device module according to the present application fully utilizes the space occupied by the overall structure thereof, and the high-pitch sound generating unit and the low-pitch sound generating unit share the frame so as to reduce the internal volume of the sound generating device module.

Other features and advantages of the present application will become apparent from the following detailed description of exemplary embodiments of the present application with reference to the accompanying drawings.

BRIEF DESCRIPTION OF THE DRAWINGS

The accompanying drawings, which are incorporated in and constitute a part of the specification, illustrate embodiments of the present application and, together with the description, serve to explain the principles of the present application.

REFERENCE NUMERALS

Figure 1:
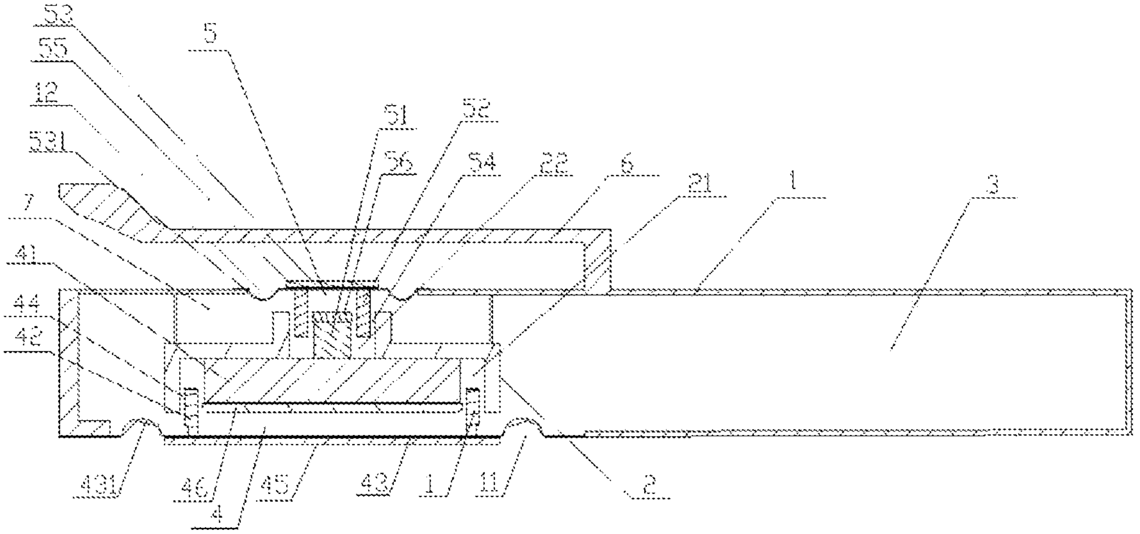
FIG. 1 is a schematic side cross-sectional view of a sound generating device module according to an embodiment of the present application.

1: housing; 11: first sound output hole; 12: second sound output hole; 2: frame; 21: first accommodation groove; 22: second accommodation groove; 23: third accommodation groove; 3: first rear sound cavity; 4: low-pitch sound generating unit: 41: first magnet; 42: first coil; 43: first diaphragm; 431: first rim; 44: first magnetic gap; 45: first stiffening plate; 46: first washer; 47: third magnet; 48: third coil; 49: third diaphragm; 40: third magnetic gap; 5: high-pitch sound generating unit; 51: second magnet; 52: second coil; 53: second diaphragm; 531: second rim; 54: second magnetic gap; 55: second stiffening plate; 56: second washer; 57: fourth magnet; 58: fourth coil; 59: fourth diaphragm; 50: fourth magnetic gap; 6: baffle plate; 7: second rear sound cavity; 8: third washer.

DETAILED DESCRIPTION OF THE EMBODIMENTS

Various exemplary embodiments of the present application will now be described in detail with reference to the accompanying drawings. It should be noted that the relative arrangement of components and steps, numerical expressions and numerical values set forth in these embodiments do not limit the scope of the present application unless specifically stated otherwise.

The following description of at least one exemplary embodiment is merely illustrative and is in no way intended to limit the present application, its application or use.

Techniques, methods, and apparatus known to those skilled in the art may not be discussed in detail, but in appropriate circumstance, such techniques, methods, and apparatus should be considered part of the specification.

In all examples shown and discussed herein, any specific value should be construed as merely exemplary and not as a limitation. Accordingly, other examples of the exemplary embodiments may have different values.

It should be noted that, similar numerals and letters indicate similar items in the following drawings. Therefore, once an item is defined in a drawing, it does not need to be further discussed in subsequent drawings.

The present application provides a sound generating device module, including:

a housing 1 having a cavity therein, the cavity is used as a rear sound cavity;

a frame 2 fixedly provided in the cavity, a high-pitch sound generating unit 5 and a low-pitch sound generating unit 4 are respectively provided on two opposite sides of the frame 2. Generally, since the frame 2 has a large volume, it occupies too much internal space of the sound generating device module, and accordingly, the volume of the module needs to be enlarged to ensure that the sound quality is not damaged. Therefore, in order to further reduce the volume of the sound generating device module, the high-pitch sound generating unit 5 and the low-pitch sound generating unit 4 are disposed on the same frame 2 in opposite directions, which can greatly reduce the volume of the sound generating device module.

A baffle plate 6 is provided on a side of the housing 1 corresponding to the high-pitch sound generating unit 5, and the baffle plate 6 cooperates with the housing 1 to form a side sound output port corresponding to the high-pitch sound generating unit 5. The baffle plate 6 cooperates with the housing 1 so that the sound generating device module forms a side sound output port for the high-pitch sound generating unit 5, and thereby the sound generated by the vibration of the high-pitch sound generating unit can be transmitted from the side surface.

The sound generating device module is configured to form a front sound output structure for the low-pitch sound generating unit 4. For example, the sound output direction of the high-pitch sound generating unit 5 and the sound output direction of the low-pitch sound generating unit 4 are perpendicular to each other. In order to satisfy different positions of sound output hole of more electronic devices, the sound output direction of the high-pitch sound generating unit 5 is changed to be perpendicular to the sound output direction of the low-pitch sound generating unit 4 through the baffle plate 6, therefore the requirements of different products for sound output positions can be satisfied.

The frame 2 and the housing 1 form a first rear sound cavity 3 and a second rear sound cavity 7 isolated from each other in the cavity, the first rear sound cavity 3 is communicated with the low-pitch sound generating unit 4, and the second rear sound cavity 7 is communicated with the high-pitch sound generating unit 5.

The housing 1 may be formed with structures such as a protrusion, a baffle wall and the like in the cavity, and the frame 2 may cooperate with the above-mentioned structures such as the protrusion, the baffle wall and the like, to divide the cavity into the first rear sound cavity 3 and the second rear sound cavity 7 by cooperating with the internal structure of the housing 1. The first rear sound cavity 3 is communicated with the low-pitch sound generating unit 4, and the second rear sound cavity 7 is communicated with the high-pitch sound generating unit 5. The first rear sound cavity 3 and the second rear sound cavity 7 isolated from each other are not communicated with each other, and the first rear sound cavity 3 and the second rear sound cavity 7 are respectively used as the rear sound cavity of the low-pitch sound generating unit 4 and the high-pitch sound generating unit 5, so as to provide the acoustic effect of rear cavity resonance and sound absorption to the sound generating unit. In this embodiment, each of the high-pitch sound generating unit 5 and the low-pitch sound generating unit 4 has a separate rear sound cavity, a separate second rear sound cavity 7 is configured as a cavity specially used by the high-pitch sound generating unit 5 to prevent the interference of the low-pitch sound generating unit 4, and since the second coil and the second diaphragm 53 has a small amplitudes in the high-pitch sound generating unit 5, the volume of the second rear sound cavity 7 does not need to be too large, as long as the second rear sound cavity 7 can enclose the second magnet 51, the second coil 52 and the second diaphragm 53 inside thereof.

In the technical solution of the present application, the high-pitch sound generating unit 5 and the low-pitch sound generating unit 4 share one frame 2, so that the first rear sound cavity 3 and the second rear sound cavity 7 are divided by the structure of the frame 2 while the space is saved, and thus, a high sound quality of the sound generating device module is ensured.

Optionally, an edge of the frame 2 bends and extends towards a direction opposite to the baffle plate 6 to form a first accommodation groove 21, and a part of the low-pitch sound generating unit 4 is disposed in the first accommodation groove 21.

A through hole is provided at a middle of the frame 2, a side wall of the through hole bends and extends towards a direction of the baffle plate 6 to form a second accommodation groove 22, and at least a part of a structure of the high-pitch sound generating unit 5 is disposed in the second accommodation groove 22.

A partition plate is provided surrounding the high-pitch sound generating unit 5 on a side of the frame 2 facing the baffle plate 6, and the partition plate separates the cavity to form the first rear sound cavity 3 and the second rear sound cavity 7. The partition plate has one end connected to the frame 2 and the other end connected to an inner wall of the housing 1, which improves the stability of the frame 2 and does not increase the occupying of the space inside the sound generating device module.

Optionally, the low-pitch sound generating unit 4 includes a first magnet 41, a first coil 42 and a first diaphragm 43, the first magnet 41 is disposed in the first accommodation groove 21 and is fixed on a bottom of the first accommodation groove 21, the first diaphragm 43 is disposed on the housing 1 at the opposite side of the opening of the first accommodation groove 21, a first magnetic gap 44 is provided between the first magnet 41 and a wall of the first accommodation groove 21, the first coil 42 is connected with the first diaphragm 43, and the first coil 42 is located in the first magnetic gap 44. The first magnetic gap 44 is formed between the first magnet 41 and the wall of the first accommodation groove 21, so that after the first coil 42 disposed in the first magnetic gap 44 is energized, the moving electric charges are subjected to a Lorentz force in the magnetic field, and the first coil 42 vibrates, so as to realize the conversion of electrical energy into mechanical energy, thereby driving the first diaphragm 43 to vibrate to generate sound.

The high-pitch sound generating unit 5 includes a second magnet 51, a second coil 52 and a second diaphragm 53, the second magnet 51 is disposed in the second accommodation groove 22 and is fixed on the first magnet 41, the second diaphragm 53 is disposed on the housing 1 at the opposite side of the opening of the second accommodation groove 22, a second magnetic gap 54 is provided between the second magnet 51 and a wall of the second accommodation groove 22, the second coil 52 is connected with the second diaphragm 53, and the second coil 52 is located in the second magnetic gap 54. The second magnet 51 is fixed on the first magnet 41, and is disposed in the second accommodation groove 22 in an opposite direction to the first magnet 41. In this case, the direction of transmitting the high-pitch sound through the second diaphragm 53 and the direction of transmitting the low-pitch sound through the first diaphragm 43 are opposite.

Meanwhile, by changing the direction of outputting the high-pitch sound through the baffle plate 6, a rear sound outputting can be changed to a side sound outputting. In order to applicable to more electronic devices, specifically, the baffle plate 6 may be disposed to be detachable, and a side of the housing 1 corresponding to the high-pitch sound generating unit 5 may be provided with a ring-shaped installation position, the baffle plate 6 may be disposed in different positions, so that the sound outputting direction of the high-pitch sound generating unit 5 can be manually adjusted, thereby the sound generating device module is applicable to more electronic devices without redesigning the structure of the sound generating device module, which is more universally used and further reduces costs.

Optionally, a first sound output hole 11 is provided at a position of the housing 1 corresponding to an opening of the first accommodation groove 21, and the first diaphragm 43 covers on the first sound output hole 11; a second sound output hole 12 is provided at a position of the housing 1 corresponding to an opening of the second accommodation groove 22, and the second diaphragm 53 covers on the second sound output hole 12. Specifically, during the vibration of the first diaphragm 43 and the second diaphragm 53, the sound is transmitted from the sound outlet holes.

Optionally, the area of the first sound output hole 11 is larger than the area of the second sound output hole 12. In order to ensure that the high-pitch sound of the sound generating device module is sweetness and transparency and the low-pitch sound of the sound generating device module is surging and shocking, it is necessary to clearly distinguish the high-pitch sound and the low-pitch sound. Thus, the area of the first sound output hole 11 needs to be larger than the area of the second sound output hole 12, and accordingly, the area of the first diaphragm 43 is also larger than the area of the second diaphragm 53. Specifically, the shapes of the first sound output hole 11 and the second sound output hole 12 are not specifically limited, and may be circular shape, waist shape or other holes that can meet the sound requirements. As an example, the first sound output hole 11 and the second sound output hole 12 are circular sound output holes, the first sound output hole 11 corresponds to the first rear sound cavity 3 and the second sound output hole 12 corresponds to the second rear sound cavity 7, the diameter of the first sound output hole 11 is larger than the diameter of the second sound output hole 12, thereby ensuring that the sound output from the first sound output hole 11 is low-pitch sound, the sound output from the second sound output hole 12 is high-pitch sound, thereby realizing the integrity for the gamut of the sound generating device module.

Optionally, edges of the first diaphragm 43 and the second diaphragm 53 are fixed on the housing 1; a portion of the first diaphragm 43 close to an edge of the first sound output hole 11 is recessed towards inside of the cavity to form a first rim 431; a portion of the second diaphragm 53 close to an edge of the second sound output hole 12 is recessed towards inside of the cavity to form a second rim 531. After the first coil and the second coil are energized, electric charges move in the first magnetic gap 44 and the second magnetic gap 54 respectively, the first coil and the second coil vibrate and drive the first diaphragm 43 and the second diaphragm 53 to vibrate, and the first rim 431 and the second rim 531 are used to prevent the first diaphragm 43 and the second diaphragm 53 from being damaged by pulling during the vibration, or prevent that the vibration amplitude is not enough which results in that the high-pitch sound and the low-pitch sound fail to meet the requirements. When the first coil 42 and the second coil 52 vibrate, the first rim 431 and the second rim 531 provide a larger margin for the vibration of the first diaphragm 43 and the second diaphragm 53, so that the sound of the sound generating device module more fidelity.

Generally, the increase of the strength of the magnetic field can improve the sensitivity and the amplitude of the vibration of the diaphragm, thereby improving the acoustic performance of the sound generating device module. The strength of the magnetic field is increased mainly by increasing the magnetism and the volume of the first magnet 41 and the second magnet 51. However, in actual product demand, the overall size of the sound generating device module is generally fixed and cannot be increased arbitrarily, which results in that the first magnet 41 and the second magnet 51 having limited volume cannot generate a strong enough magnetic field and thereby cannot achieve the required acoustic performance. Therefore, by allowing the low-pitch sound generating unit 4 and the high-pitch sound generating unit 5 to share the same frame 2, the volume of the first magnet 41 and the second magnet 51 can be further increased without increasing the overall volume of the sound generating device module, thereby achieving the required acoustics performance. Or, the volume of the sound generating device module can be further reduced, and accordingly, the sound generating device module is applicable to more electronic devices, or the volume of the electronic devices can be further reduced.

Optionally, a first stiffening plate 45 and a second stiffening plate 55 are respectively fixed on the first diaphragm 43 and the second diaphragm 53. During the vibration of the first diaphragm 43 and the second diaphragm 53, since the diaphragm is made of soft material, the acoustic performance may be lost as the vibration frequency changes. By providing the first stiffening plate 45 and the second stiffening plate 55 on the first diaphragm 43 and the second diaphragm 53 respectively, the diaphragm can be subject to overall and reliable balance restriction, and the possibility of polarization and tilt vibration of the diaphragm is greatly reduced.

Optionally, a first washer is provided on a side of the first magnet 41 facing the first diaphragm 43; and a second washer is provided on a side of the second magnet 51 facing the second diaphragm 53, so as to reduce the possibility of polarization caused by the unbalanced driving force of the whole vibration assembly. By means of the first washer and the second washer, the magnetic field strength and magnetic field uniformity at the magnetic gap are further improved, and a uniform and stronger magnetic field is formed in the magnetic gap, so that the first coil and the second coil can receive an improved magnetic field in each area along the circumferential direction thereof, thereby improving the acoustic performance of the sound generating device module.

Figure 2:
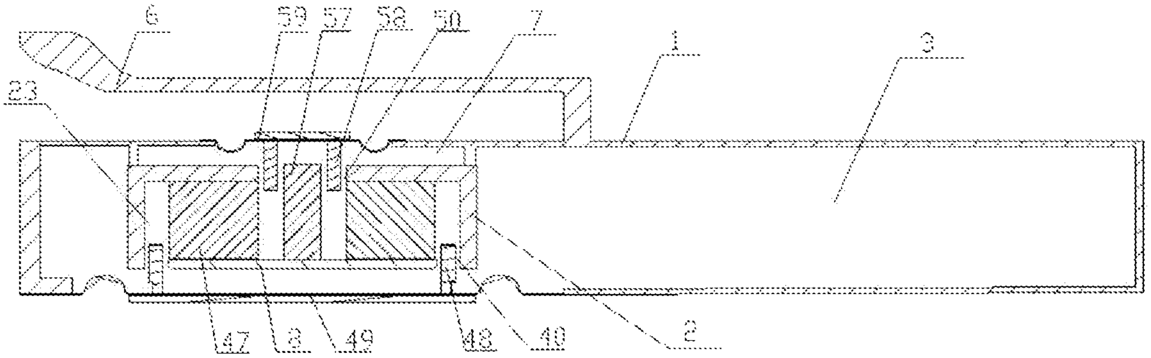
FIG. 2 is a schematic side cross-sectional view of another sound generating device module according to an embodiment of the present application.

Optionally, as shown in FIG. 2, an edge of the frame 2 bends and extends in a direction opposite to the baffle plate 6 to form a third accommodation groove 23, and at least a part of a structure of the low-pitch sound generating unit 4 is disposed in the third accommodation groove 23; a mounting hole is provided at a middle of the frame 2, and at least a part of a structure of the high-pitch sound generating unit 5 is disposed in the third accommodation groove 23 by penetrating the mounting hole. The frame 2 is provided with the third accommodation groove 23 on a side facing a third diaphragm 49, and both of the high-pitch sound generating unit 5 and the low-pitch sound generating unit 4 are disposed in the third accommodation groove 23, so that the space occupied by the frame 2 is further reduced, thereby the volume of the sound generating device module is reduced, allowing the sound generating device module to be applicable to the thinner electronic devices.

A partition plate is provided surrounding the high-pitch sound generating unit 5 on a side of the frame 2 facing the baffle plate 6, and the partition plate separates the cavity to form the first rear sound cavity 3 and the second rear sound cavity 7. The partition plate has one end connected to the frame 2 and the other end connected to an inner wall of the housing 1, which improves the stability of the frame 2 without increasing the space inside the sound generating device module.

Optionally, the low-pitch sound generating unit 4 includes a third magnet 47, a third coil 48 and a third diaphragm 49, the third magnet 47 has an annular shape and is fixed on a bottom of the third accommodation groove 23, a third magnetic gap 40 is provided between the third magnet 47 and a wall of the third accommodation groove 23, the third coil 48 is connected with the third diaphragm 49, and the third coil 48 is located in the third magnetic gap 40; wherein the third magnet 47 is an annular structure with a hollow center, the third magnetic gap 40 is provided between a wall of the third accommodation groove 23 and a side wall of the third magnet 47, the third coil 48 vibrates to drive the third diaphragm 49 to vibrate, so as to realize the sound generation of the low-pitch sound generating unit 4.

The high-pitch sound generating unit 5 includes a fourth magnet 57, a fourth coil 58 and a fourth diaphragm 59, the fourth magnet 57 has a columnar shape and is disposed in a center of the third magnet 47 by penetrating the through hole, a fourth magnetic gap 50 is provided between the fourth magnet 57 and the third magnet 47, the fourth diaphragm is dispose on a side of the housing corresponding to the baffle plate, the fourth coil 58 is connected with the fourth diaphragm 59, and the fourth coil 58 is located in the fourth magnetic gap 50. The fourth magnet 57 passes through a center of the third magnet 47 and forms the fourth magnetic gap 50 with an inner circumference of the third magnet 47, the fourth coil 58 vibrates to drive the fourth diaphragm 59 to vibrate, so as to realize the sound generation of the high-pitch sound generating unit 5, furthermore, the structure thereof is very compact, so as to further save the internal space of the sound generating device module and reduce the volume of the sound generating device module, and allow the sound generating device module to be applicable to more electronic devices with smaller volumes.

Optionally, a third washer 8 is disposed on a side of the third magnet 47 facing an opening of the third accommodation groove 23, and the fourth magnet 57 is fixed on the third washer 8. The third washer 8 is fixed in the cavity through the third magnet 47, provides a position for mounting and fixing the fourth magnet 57, and the third washer 8 can guide the magnetic induction lines of the third magnet 47 and the fourth magnet 57 at the same time, so that the third voice coil and the fourth voice coil can receive an improved magnetic field in each area along the circumferential direction thereof, thereby improving the acoustic performance of the sound generating device module.

Optionally, a third sound output hole is provided at a position of the housing 1 corresponding to an opening of the third accommodation groove 23, and the third diaphragm 49 covers on the third sound output hole; a fourth sound output hole is provided on the housing at a side opposite to the third sound output hole, and the fourth diaphragm 59 covers on the fourth sound output hole; the area of the third sound output hole is larger than the area of the fourth sound output hole. In order to ensure that the high-pitch sound of the sound generating device module is sweetness and transparency and the low-pitch sound of the sound generating device module is surging and shocking, it is necessary to clearly distinguish the high-pitch sound and the low-pitch sound, and thus, the area of the third sound output hole needs to be larger than the area of the fourth sound output hole, and accordingly, the area of the third diaphragm 49 is also larger than the area of the fourth diaphragm 59. Specifically, the shapes of the third sound output hole and the fourth sound output hole are not specifically limited, and may be circular shape, waist shape or other holes that can meet the sound requirements. As an example, the third sound output hole and the fourth sound output hole are circular sound output holes, the diameter of the third sound output hole is larger than the diameter of the fourth sound output hole, which ensures that the sound output from the third sound output hole is low-pitch sound, the sound output from the fourth sound output hole is high-pitch sound, thereby realizing the integrity for the gamut of the sound generating device module.

Likewise, accordingly, corresponding rims and corresponding stiffening plates may also be provided on the third diaphragm 49 and the fourth diaphragm 59 to improve the acoustic performance.

Although some specific embodiments of the present application have been described in detail by way of examples, those skilled in the art should understand that the above examples are for illustration only and not for the purpose of limiting the scope of the present application. It will be understood by those skilled in the art that the above embodiments can be modified without departing from the scope and spirit of the present application. The scope of the present application is defined by the appended claims.

What is claimed is:

1. A sound generating device, comprising:

a housing having a cavity therein; and a frame fixedly provided in the cavity, a high-pitch sound generator and a low-pitch sound generator are respectively provided on two opposite sides of the frame, wherein a baffle plate is provided on a side of the housing corresponding to the high-pitch sound generator, and the baffle plate and the housing together form a side sound output port corresponding to the high-pitch sound generator;

wherein the sound generating device module is configured to form a front sound output structure for the low-pitch sound generator; and wherein the frame and the housing form a first rear sound cavity and a second rear sound cavity isolated from each other in the cavity, the first rear sound cavity is communicated with the low-pitch sound generator; and the second rear sound cavity is communicated with the high-pitch sound generator, wherein an edge of the frame bends and extends towards a direction opposite to the baffle plate to form a first accommodation groove, and at least a part of a structure of the low-pitch sound generator is disposed in the first accommodation groove;

wherein a through hole is provided at a middle of the frame, a side wall of the through hole bends and extends towards a direction of the baffle plate to form a second accommodation groove, and at least a part of a structure of the high-pitch sound generator is disposed in the second accommodation groove; and wherein a partition plate is provided surrounding the high-pitch sound generator on a side of the frame facing the baffle plate, and the partition plate separates the cavity to form the first rear sound cavity and the second rear sound cavity;

or wherein an edge of the frame bends and extends towards a direction opposite to the baffle plate to form a third accommodation groove, and at least a part of a structure of the low-pitch sound generator is disposed in the third accommodation groove;

wherein a mounting hole is provided at a center of the frame, and at least a part of a structure of the high-pitch sound generator is disposed in the third accommodation groove by penetrating the mounting hole; and wherein a partition plate is provided surrounding the high-pitch sound generator on a side of the frame facing the baffle plate, and the partition plate separates the cavity to form the first rear sound cavity and the second rear sound cavity.

2. The sound generating device module of claim 1, wherein the low-pitch sound generator comprises a first magnet, a first coil and a first diaphragm, the first magnet is disposed in the first accommodation groove and is fixed on a bottom of the first accommodation groove, the first diaphragm is disposed on the housing on an opposite side of an opening of the first accommodation groove, a first magnetic gap is provided between the first magnet and a wall of the first accommodation groove, the first coil is connected with the first diaphragm, and the first coil is located in the first magnetic gap; and the high-pitch sound generator comprises a second magnet, a second coil and a second diaphragm, the second magnet is disposed in the second accommodation groove and is fixed on the first magnet, the second diaphragm is disposed on the housing at an opposite side of an opening of the second accommodation groove, a second magnetic gap is provided between the second magnet and a wall of the second accommodation groove, the second coil is connected with the second diaphragm, and the second coil is located in the second magnetic gap.

3. The sound generating device of claim 2, wherein a first sound output hole is provided at a position of the housing corresponding to an opening of the first accommodation groove, and the first diaphragm covers on the first sound output hole;

wherein a second sound output hole is provided at a position of the housing corresponding to an opening of the second accommodation groove, and the second diaphragm covers on the second sound output hole; and wherein an area of the first sound output hole is larger than an area of the second sound output hole.

4. The sound generating device of claim 3, wherein edges of the first diaphragm and edges of the second diaphragm are fixed on the housing;

wherein a portion of the first diaphragm close to an edge of the first sound output hole is recessed towards inside of the cavity to form a first rim;

wherein a portion of the second diaphragm close to an edge of the second sound output hole is recessed towards inside of the cavity to form a second rim; and a first stiffening plate and a second stiffening plate are respectively fixed on the first diaphragm and the second diaphragm.

5. The sound generating device of claim 2, wherein a first washer is disposed on a side of the first magnet facing the first diaphragm; and wherein a second washer is disposed on a side of the second magnet facing the second diaphragm.

6. The sound generating device of claim 1, wherein the low-pitch sound generator includes a third magnet, a third coil and a third diaphragm, the third magnet has an annular shape and is fixed on a bottom of the third accommodation groove, a third magnetic gap is provided between the third magnet and a wall of the third accommodation groove, the third coil is connected with the third diaphragm, and the third coil is located in the third magnetic gap; and the high-pitch sound generator includes a fourth magnet, a fourth coil and a fourth diaphragm, the fourth magnet has a columnar shape and is disposed in a center of the third magnet by penetrating the mounting hole, a fourth magnetic gap is provided between the fourth magnet and the third magnet, the fourth diaphragm is disposed on a side of the housing corresponding to the baffle plate, the fourth coil is connected with the fourth diaphragm, and the fourth coil is located in the fourth magnetic gap.

7. The sound generating device of claim 6, wherein a third washer is disposed on a side of the third magnet facing an opening of the third accommodation groove, and the fourth magnet is fixed on the third washer.

8. The sound generating device of claim 6, wherein a third sound output hole is provided at a position of the housing corresponding to an opening of the third accommodation groove, and the third diaphragm covers on the third sound output hole;

wherein a fourth sound output hole is provided on the housing at a side opposite to the third sound output hole, and the fourth diaphragm covers on the fourth sound output hole; and wherein an area of the third sound output hole is larger than an area of the fourth sound output hole.

* * * * *